United States Patent
Hurlburt et al.

[15] 3,706,186
[45] Dec. 19, 1972

[54] SUSPENSION SYSTEM FOR A MOWER UNIT

[72] Inventors: Joseph C. Hurlburt, Leola; John H. Freimuth, New Holland, both of Pa.

[73] Assignee: Sperry Rand Corporation, New Holland, Pa.

[22] Filed: July 7, 1971

[21] Appl. No.: 160,288

[52] U.S. Cl. ...................................56/15.8, 56/16.3
[51] Int. Cl. ..............................................A01d 35/26
[58] Field of Search............56/15.3, 15.7, 15.8, 15.9, 56/16.3, 11.6, 6

[56] References Cited

UNITED STATES PATENTS

| | | | |
|---|---|---|---|
| 3,118,266 | 1/1964 | Colburn | 56/15.8 X |
| 3,402,536 | 9/1968 | Hale et al. | 56/15.7 X |
| 3,408,798 | 11/1968 | Hale et al. | 56/15.3 X |
| 3,483,684 | 12/1969 | Price | 56/15.3 X |
| 2,924,928 | 2/1960 | Rhoades et al. | 56/15.8 X |

*Primary Examiner*—Louis G. Mancene
*Assistant Examiner*—J. N. Eskovitz
*Attorney*—John C. Thompson et al.

[57] ABSTRACT

A mower suspension system for tractively coupling a rotary mower unit beneath the belly or main frame of a tractor. The mower suspension system is basically comprised of a generally parallel four bar linkage arrangement including a front draft linkage interconnecting a front pivotal axle of the tractor with a front portion of the mower unit and a rear lift link pivotally interconnecting an intermediate portion of the tractor chassis structure with a rear portion of the mower unit. Further provided is a ball joint attaching assembly within the rear lift linkage structure which enables the mower unit to tilt from side to side in response to movement over ground irregularities of ground engaging rollers disposed rearwardly on the mower unit and the front wheels, and yet maintain the mower unit in a plane generally parallel to the chassis when the axle and associated front wheels are disposed on generally level ground terrain.

11 Claims, 9 Drawing Figures

PATENTED DEC 19 1972

INVENTOR
JOSEPH C. HURLBURT
JOHN H. FREIMUTH
BY
Larry L. Coots
ATTORNEY

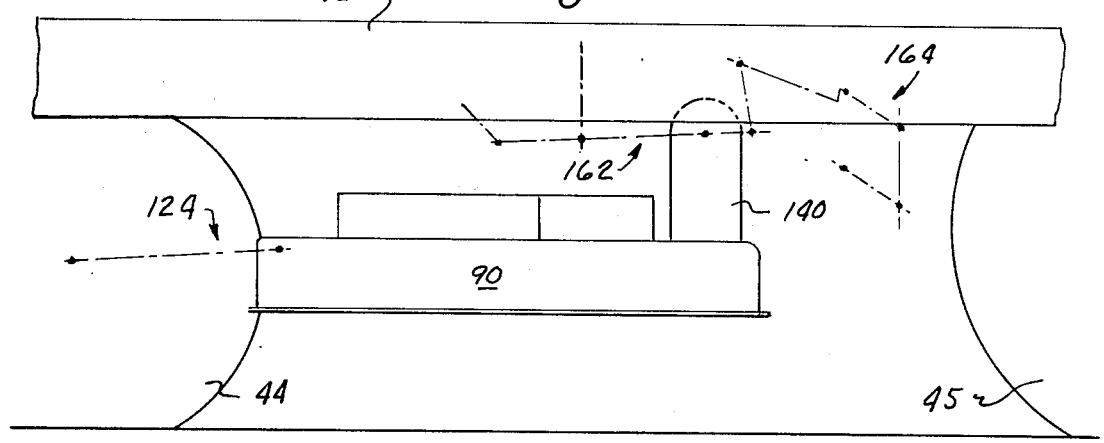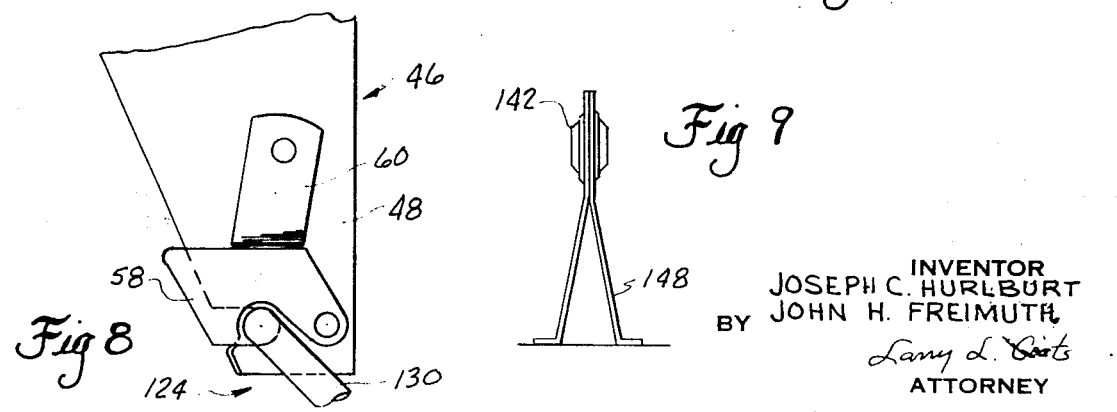

SUSPENSION SYSTEM FOR A MOWER UNIT

BACKGROUND OF THE INVENTION

This invention relates to mowing devices and more particularly to a linkage suspension system for supporting a mower unit beneath the main frame of a lawn vehicle.

Lawn and garden vehicles of both the tractor and simple riding type have enjoyed much commercial success and continue to appeal to farm and residential consumers. With few exceptions, these lawn and garden vehicles are adapted to receive and drive a rotary mower attachment which is commonly mounted beneath the belly or main frame of the vehicle. One of the more important design considerations with respect to these lawn vehicles and their associated mower attachment involves the suspension system for supporting the mower unit in transport and controlling its mowing disposition such that an even cut is realized as the vehicle and mower unit traverse various irregularities and undulations in the ground surface.

SUMMARY OF THE INVENTION

Applicants' invention basically comprises a generally parallel four bar linkage structure interconnecting a rotary mower unit with the main frame and front axle of a tractor. The parallel four bar linkage structure comprises a front draft linkage pivotally connected at one extremity to an attachment support that depends from a front pivotal axle and pivotally connected at the other extremity to the front portion of the rotary mower unit. The rear of the mower unit is supported by a lift linkage that is generally disposed in parallel relationship to the draft linkage and is of approximately equal length. The lift linkage is pivotally connected about one extremity to the main frame about a transverse axis and extends generally downwardly therefrom to where the other extremity is pivotally connected within a ball joint attaching assembly that is confined within an upper portion of a rear mower housing mounting bracket. This parallel four bar linkage structure with the rear attaching ball joint assembly allows the mower unit to tilt from side to side as the ground engaging rollers move over irregular ground terrain and also as the front wheels of the front axle move over appreciable ground irregularities. The same parallel four bar linkage further enables the mower unit to maintain itself in a plane generally parallel to the tractor chassis when the front wheels are on level terrain.

Moreover, it is an object of the present invention to provide a linkage suspension system for a rotary mower unit that allows the mower unit to closely trace the irregularly contoured ground such that an even cut is realized and scalping is avoided.

Another object of the present invention resides in the provision of a mower suspension system that (1) maintains the mower unit in a plane generally parallel to the chassis or main frame of the vehicle when each of the front wheels are at substantially the same elevation and (2) enables the mower unit to tilt from side to side about a longitudinal axis relative to the vehicle as the tractor mounted mower traverses uneven ground.

In accordance with the object recited immediately above, it is a further object of the present invention to provide the mower suspension system with a novel four bar linkage arrangement, the four bar linkage arrangement being comprised of a front draft linkage structure pivotally interconnecting the front pivotal axle of the tractor with a front portion of the mower unit and a rear lift linkage pivotally interconnecting an intermediate portion of the vehicle's main frame with a rear portion of the mower unit, the rear lift linkage further including a ball joint attaching assembly that enables the mower unit to tilt from side to side and being disposed in general parallel relationship with the front draft linkage structure and of approximately equal length so as to define a parallel four bar linkage suspension structure.

A further object of the present invention is to provide a generally slender U-shaped draft linkage structure having arms with respective ends pivotally confined within front mounting brackets on the mower unit, the torsional characteristics inherent in the slender U-shaped draft linkage coupled with the lost motion in the pivotal connection of the arms with the front mounting brackets resulting in relatively little side to side mower tilting as the front wheels and front axle traverse minor ground irregularities, but further enabling the mower unit to tilt side to side a minor degree in response to the gauging of the mower's rear transverse rollers.

A further object of the present invention is to provide the front axle with an attachment support that functions to stabilize the front axle and includes means for quickly and easily coupling attachments thereto.

Another object of the present invention is to provide the front axle with an attachment support of a generally inverted U-shape, with the base of the U-shape fixed to a lower portion of the axle and having a flange portion pivotally connected to a longitudinally extending pivot pin on which the front axle revolves, the U-shape attachment support further including a pair of laterally spaced legs depending from the base portion and provided with openings about the lower ends thereof for receiving the front draft linkage of the mower unit.

Other objects and advantages of the present invention will become apparent and obvious from a study of the following description and the accompanying drawings which are merely illustrative of the present invention.

BRIEF DESCRIPTION OF THE DRAWINGS

FIG. 6 is a schematic view illustrating the relative relationship of the suspension linkage structure, the tractor chassis and mower unit when the linkage structure is raised to a transport position.

FIG. 7 is a front elevational view of the lawn and garden tractor and associated rotary mower unit showing the mower suspension linkage structure coupling the mower unit beneath the main frame of the tractor.

FIG. 8 is an enlarged fragmentary side view of the attachment support structure which interconnects the front axle of the tractor with the front portion of a mower unit.

FIG. 9 is an enlarged front elevational view of the rear mounting bracket of a mower unit, showing particularly the disposition of the ball joint attaching assembly.

In the following description right-hand and left-hand reference is determined by standing to the rear of the tractor and facing the direction of travel.

DESCRIPTION OF THE PREFERRED EMBODIMENT

Figure 1:
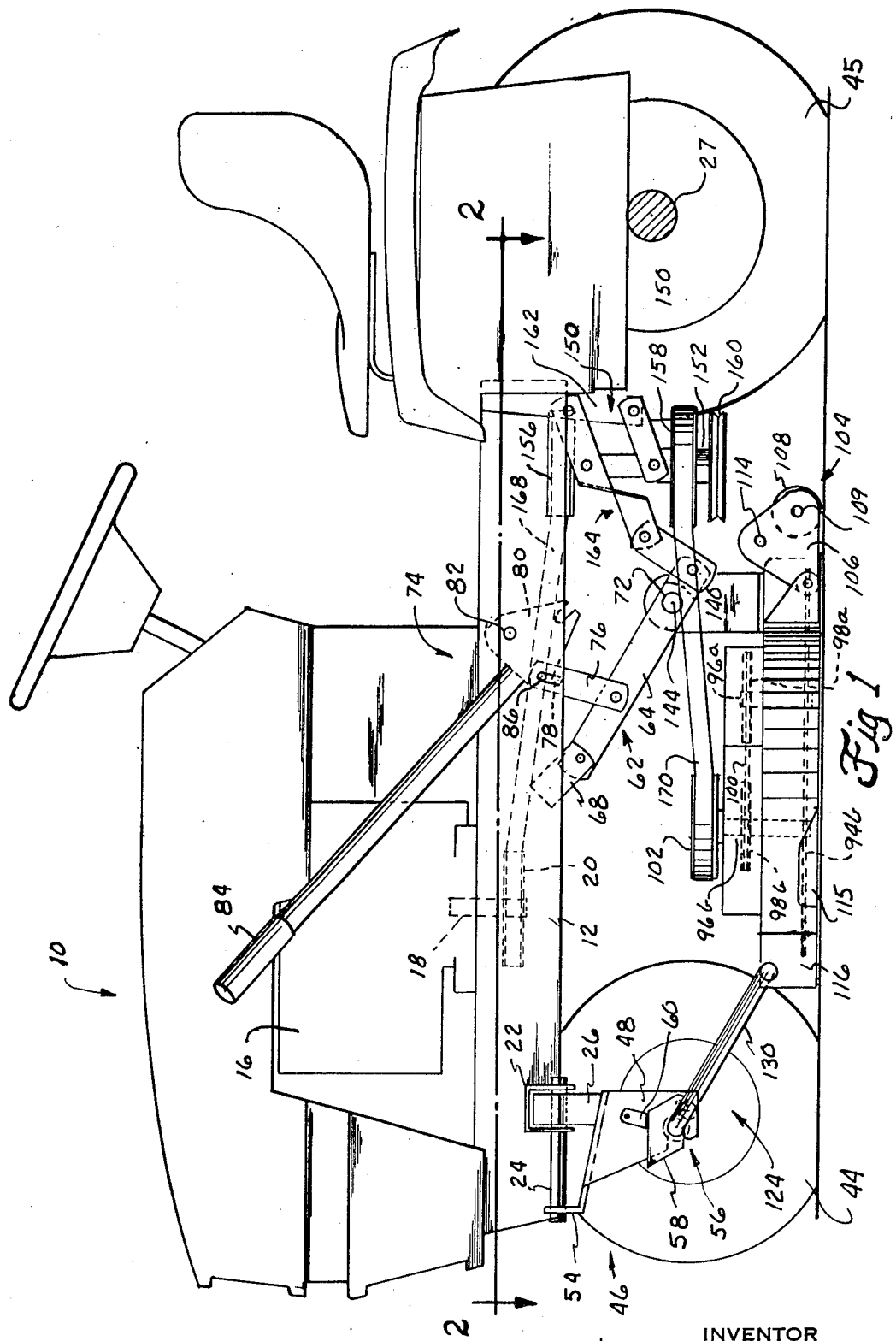
FIG. 1 is a side elevational view of a lawn and garden tractor having a rotary mower unit suspended therefrom by a linkage structure forming the present invention.
Figure 2:
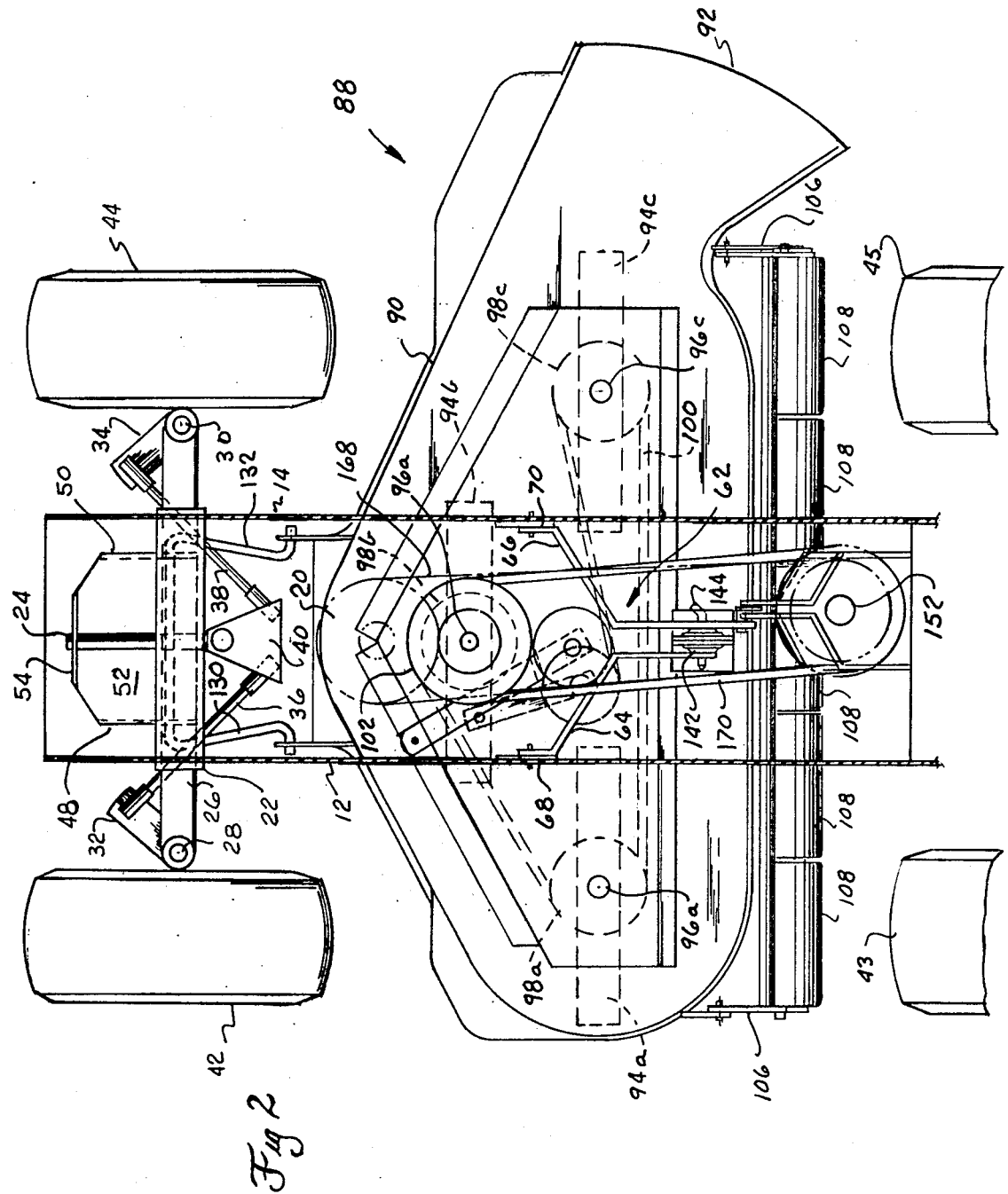
FIG. 2 is a plan view taken through the line 2—2 of FIG. 1.

With particular reference to FIGS. 1 and 2, a lawn and garden tractor, indicated by the numeral 10 generally, is shown therein and is comprised of a chassis or main frame structure having a pair of longitudinally, laterally spaced leg members 12,14. Mounted between the leg members 12,14 about an intermediate portion is a power source in the form of an engine 16. The engine 16 has an output power shaft 18 rotatably mounted in a lower portion thereof and extending downwardly therefrom to where a driving sheave 20 is fixed thereto.

A front axle casing 22 is transversely mounted in a lower front portion of said leg members, 12,14. Fixed to and extending through the front axle casing 22 is a longitudinally disposed shaft 24, the shaft 24 having a front axle 26 bearinged therearound and transversely disposed within the front axle casing 22. With particular reference to FIG. 2, it is seen that the front axle 26 includes a pair of spindles 28,30, the spindles being rotatably mounted in opposite ends of the axle and having wheels 42,44 rotatably mounted thereon. The spindles 28,30 have affixed thereto a pair of radius arms 32,34 respectively.

The radius arms 32,34 are actuated for steering the front wheels 42,44 by a pair of drag links 36,38 which pivotally interconnect the radius arms with a pivot plate 40. The pivot plate 40 is pivoted by a conventional steering assembly that is not particularly shown in the drawings or discussed herein because such is not deemed of material importance to the present invention.

The rear of the tractor chassis or main frame is supported by a transversely extending rear axle 27 that is disposed within the rear of the chassis structure and includes a pair of rear wheels 43,45, the wheels being rotatably mounted on opposite ends of the rear axle.

Welded or fixed by other suitable means to the front axle 26 is an attachment support 46 that extends generally downwardly from the axle. Viewing the attachment support 46, it is noted that the attachment support is of a generally inverted U-shape and is centrally disposed between the front wheels 42,44. The attachment support 46 includes a back portion 52 that is fixed to the underside of the front axle 26 and extends between a pair of laterally spaced mounting brackets or legs 48,50 which depend downwardly in a vertical posture. A front portion of the back 52 is referred to as a flanged portion 54, the flange portion 54 having an opening therein rotatively mounted around a front portion of shaft 24. Formed within lower portions of each leg 48,50 is an opening 56 for receiving a connecting link from a particular attachment to be coupled to the lawn and garden tractor 10. This connecting link is confined within the leg openings 56 by a pivotally mounted latch 58 which tends to curl around the connecting link and secure it firmly within the legs 48,50. To assure that the latch 58 is not jarred loose or otherwise parted from the openings 56 and connecting link, a locking mechanism, indicated by numerals 60, is provided for abutting engagement with an edge of the latch 58. As particularly seen in FIG. 1 the lock 60 is pivotally mounted adjacent a respective leg such that it can be moved from engagement with the latch 58 and the connecting link and associated attachment can be quickly and easily disconnected therefrom.

Figure 3:
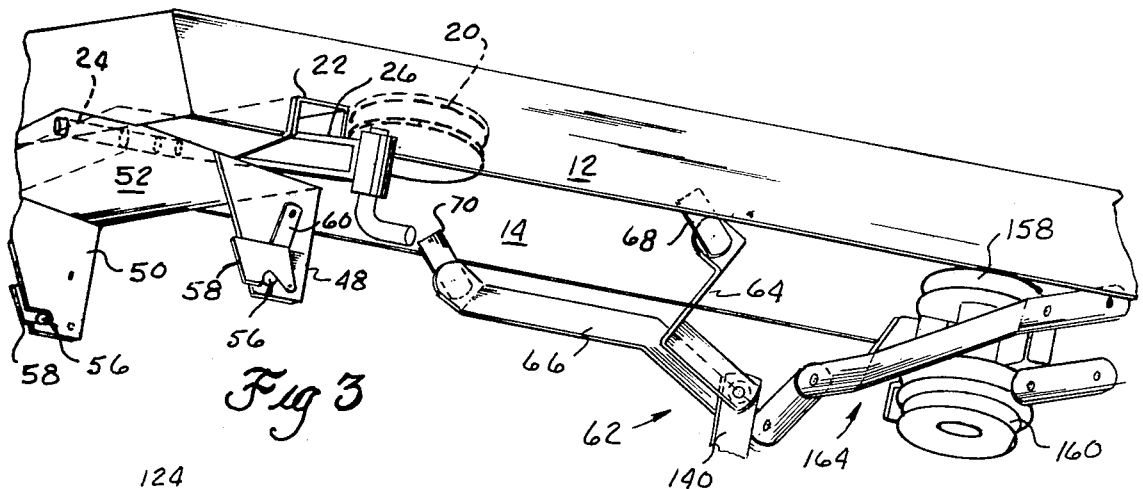
FIG. 3 is a perspective view viewing the chassis or main frame of the lawn and garden tractor from beneath and to one side.

As best seen in the FIGS. 1–3, the lawn and garden tractor 10 of the present invention has a lift linkage structure, indicated generally by the numeral 62, pivotally depending from an intermediate portion of the chassis structure. In particular, this lift linkage structure 62 includes a pair of corresponding lift links 64,66, which are pivotally connected about an upper extremity by a pair of mounting brackets 68,70 respectively, that are fixed to the longitudinal leg members 12,14. It is noted from FIG. 2 that the links 64,66 generally extend downwardly and inwardly to an intermediate point where the lower or other end extremities extend downwardly and rearwardly in spaced apart parallel relationship. The lower and rearmost extremities of each lift link 64,66 is provided with a transverse aligned opening 72.

To raise and lower the rear lift linkage 62 between a transport and operative position, a lift mechanism 74 is provided. As best seen in FIG. 1 the lift mechanism 74 includes a plate 80 pivotally connected to the left side leg member 12 by a pivot connection 82. Fixed to one edge of the plate 80 and extending therefrom is a handle 84 that is generally disposed in close proximity to the operator's station such that the operator has convenient access thereto. The plate 80 and lift linkage 62 is interconnected by a connecting link 76, the connecting link including an elongated slot 78 confined about a stud 86 that is fixed to and extends laterally from the plate 80. Thus the lift linkage 62 is free to float up and down relative to the chassis structure because of the lost motion that is in the elongated slot 78 of the connecting link 76.

Figure 4:
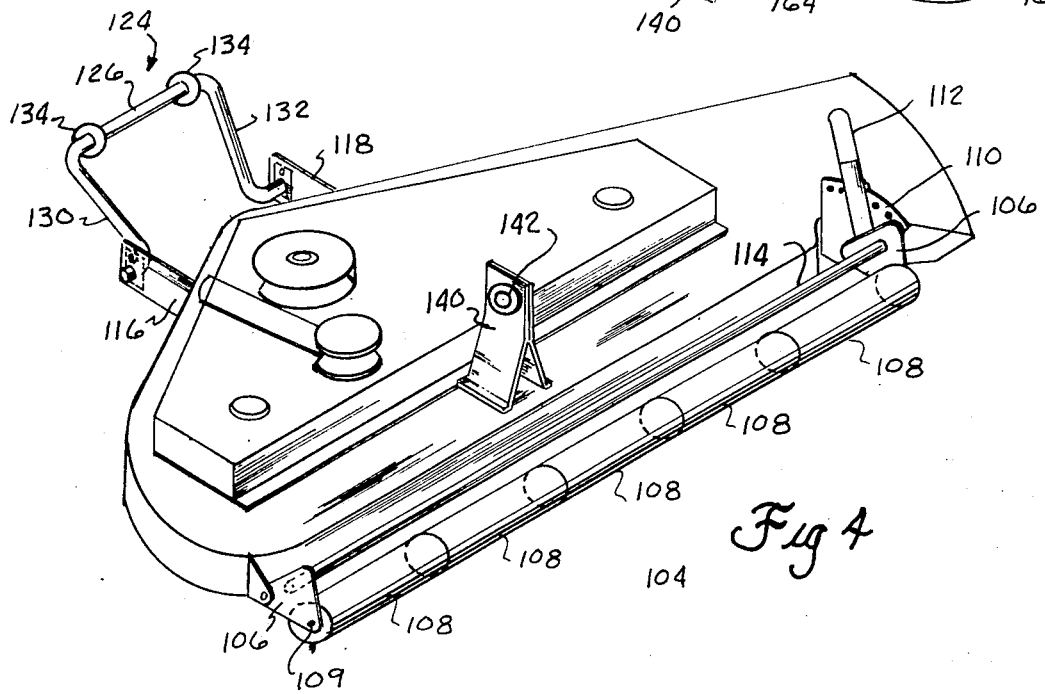
FIG. 4 is also a perspective view showing the rotary mower unit and the front attaching draft linkage.

The lawn and garden tractor 10 of the present invention is adapted to receive a belly mounted rotary lawn mower indicated generally by the numeral 88. With particular reference to FIGS. 2 and 4, it is seen that the rotary mower 88 comprises a conventional housing structure 90 having a right hand discharge area 92 for the grass cuttings to escape from. Also the mower housing 90 is provided with three laterally spaced rotatably driven cutting blades 94a, 94b, 94c. These blades are affixed to and rotative with three drive shafts 96a, 96b, 96c. The drive shafts are rotatably mounted within top portions of the housing 90 and include sheaves 98a, 98b, 98c, these sheaves being drivingly interconnected by a flexible V-belt indicated by the numeral 100. Power is transmitted to the blades by a driven sheave 102 that is fixed to an upper portion of the front middle shaft 98b, the driven sheave being disposed atop the mower housing 90 such that it may readily receive a driving belt.

Disposed behind the rotary mower 88 is a height adjusting mechanism 104. Specifically, the height adjusting mechanism 104 includes a pair of end plates 106 pivotally connected to rear extending mounting brackets affixed about the rear of the mower housing 90. Transversely disposed between the end brackets 106 is an axle 109 having a plurality of rollers 108 rotatably mounted in side by side relationship thereacross. The end brackets further include a transverse stabilizing rod 114 which extends generally parallel to the axle 109. For raising and lowering the ground engaging rollers 108 to adjust the cutting height of the blades 94a, 94b and 94c a quadrant 110 is fixedly mounted adjacent the right hand end plate 106. Extending from the right hand end plate 106 is a handle 112 which is disposed adjacent the quadrant 110 and provided with locking means, not shown, for selectively stationing the rollers at any one of a series of heights.

The front portion of the mower housing 90 is provided with a pair of skids 115, each skid being affixed to one side of a mower housing 90 and engageable with the ground being traversed.

Figure 5:
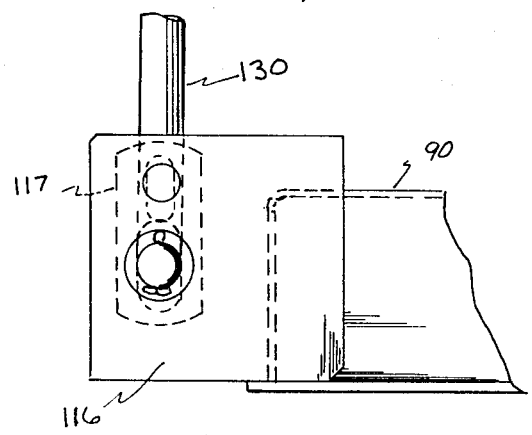
FIG. 5 is a detailed view illustrating the adjustment feature of the mower units' front mounting brackets.

Laterally spaced and forwardly extending from a central front portion of a mower housing 90 is a pair of mower housing mounting brackets 116,118. As particularly seen in FIGS. 4 and 5, the mounting brackets 116,118 include adjustable shims 117,119 for adjusting the particular height of the front of the mower unit 88.

Continuing to refer to FIG. 4, it is noted that the connecting linkage shown in the present case is a generally U-shaped draft linkage indicated generally by numeral 124. The front draft linkage 124 is comprised of a base rod 126 which extends between a pair of arms 130,132. Each of the arms 130,132 include an outwardly curled end that is adapted to be received within the front portion of the mower housing mounting brackets 116,118. Furthermore, it is noted that the base portion 126 includes a pair of laterally spaced stops 134. These stops serve to align the U-shape front draft linkage for quick attachment into the legs 48,50 of the front attachment support 46. Also the stops 134 prevent the base portion 126 of the front draft linkage from shifting laterally back and forth within the leg openings 56 as the tractor 10 moves along hillsides.

The rear of the rotary mower 88 is coupled to the rear lift linkage 62 by a centrally disposed, upstanding bracket 140, as particularly shown in FIG. 4. Confined within an upper portion of the rear mounting bracket 140 is a ball joint attaching assembly 142. The lift linkage 62 is connected to the rear mounting bracket 140 by a pin 144, FIG. 7, which is inserted through the openings 72 of the lift links 64,66 and on through the ball joint attaching assembly.

To provide power to the rotary mower 88 a stroking jack shaft 150 is drivingly interconnected between the driving sheave 20 and the driven sheave 102 disposed atop the mower housing 90. Viewing the jack shaft 150 in detail, it is seen that a shaft 152 is rotatively disposed in a housing 154. The jack shaft includes three sheaves—a first sheave 156, a second sheave 158 and an auxiliary sheave 160, the sheaves being vertically spaced along the vertically oriented jack shaft 152. The housing 154 which rotatively supports the jack shaft 152 is moveably supported by a dual four bar linkage 164 which is pivotally mounted at one extremity to a downwardly extending rear mounting plate 162 which is fixed between the leg members 12,14 of the chassis structure. The dual four bar linkage 164 is connected at its forward extremity to the lift linkage 62 and is moveable up and down in response to the floatation of the mower unit such that sheave 156 is maintained in close alignment with the driving sheave 20, while the sheave 158 is maintained in close alignment with driven sheave 102 that moves up and down with the rotary mower 88 as it moves over various ground irregularities and undulations therein.

To connect the mower unit 88 of the present invention beneath the tractor 10, it simply becomes a matter of inserting the base portion 126 of the front draft linkage. 124 within the openings 56 of the support attachment 46. Next the front support or the front draft linkage is firmly secured therein by enclosing the base portion 126 within the openings 56 by pivoting the latch 58 therearound and locking the latch in place by turning the locking bar 48 to its downwardly position as shown in FIG. 1. The rear of the mower is attached to the lift linkage 62 by inserting pin 144 through the openings 72 and on through the ball joint attaching assembly 142. When the mower is not in use the lift mechanism 74 is employed to raise the entire mower unit up to a transport position as shown schematically in FIG. 6.

In the cutting operation, the lift mechanism 74 is lowered such that the skids 115 and ground engaging rollers 108 are engaged with the ground. It will be noted that the elongated slot 78 formed within connecting link 76 gives the lift linkage 62 the freedom to swing up and down about a transverse axis generally coinciding with the pivotal connection of the links 64,66 with the mounting bracket 68,70. One very important aspect of the present invention is that the suspension linkage structure is designed to be of a general parallel four bar linkage arrangement. Therefore the straight line distances between the pivotal connections of the front draft linkage 124 and the lift linkage 62 are of equal length and disposed in parallel relationship. Expressed in another way, the front draft linkage 124 and the lift linkage 62 are of equal length and disposed in parallel relationship such that imaginary lines connecting their pivotal connections define a parallelogram. Moreover, the fact that the connecting linkage structures are of approximately equal length and disposed in parallel relationship gives rise to a four bar linkage structure, the four bars being the two linkage structures 124,62, the tractor chassis and the mower unit.

The effect of the parallel four bar linkage is that when the front axle is disposed in a level posture, the mower unit 88 moves up and down in a plane parallel to the chassis as the skids 115 and ground engaging rollers 108 traverse undulations or irregularities in the ground. When the front axle pivots appreciably about shaft 24, the mower 88 tilts from side to side therewith since the front attaching support 46 is affixed to the axle 26. But because of the slender nature of the U-shaped front draft linkage 124, a torsional characteristic is realized therein and the mower unit thereof does not move directly in proportion to the movement of the front axle but moves in a somewhat compromising and delayed fashion.

Also as the front axle tilts the ground engaging roller 108 and skids 115 continue to serve as an input to the suspension system and in some cases may act against the dictates of the front axle thereby yielding a compromising mower unit posture which tends to average out the elevations and undulations in the ground to yield a compromising disposition that results in a very uniform cut in light of the various different elevations of the ground being transversed. The ball joint attaching assembly plays a very significant part in the present suspension system in that it forms a part of the parallel four bar linkage that enables the mower 88 to move in a general plane parallel to the chassis but yet permits the mower unit to tilt from side to side while moving up and down relative to the chassis.

The terms, "upper," "lower," "forward," "rearward" etc. have been used herein merely for the convenience of the foregoing specification and in the appended claims to describe the mower suspension system and its parts as oriented in the drawings. It is to be understood, however, that these terms are in no way limiting to the invention since the mower suspension system may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

Having thus described our invention, what we claim is:

1. A mower suspension system for a mobile lawn vehicle, comprising in combination:
    a frame structure;
    a transversely extending front axle pivotally mounted to said frame structure about a longitudinally extending axis;
    a transversely extending rear axle mounted to said frame structure and spaced rearwardly from said front axle;
    wheels rotatively mounted on opposite ends of said front and rear axles;
    a mower unit disposed beneath said frame structure intermediately between said front and rear axles, said mower unit including cutting means therein;
    ground engaging means associated with said mower unit for maintaining said cutting means a predetermined height above the ground;
    support means fixed to said front axle;
    draft linkage means pivotally interconnecting a forward portion of said mower unit with said support means for allowing said mower unit to tilt from side to side in response to the pivotable movement of said front axle;
    a lift linkage structure pivotally interconnecting a rear portion of said mower unit with said frame structure, said lift linkage structure being approximately equal in length to said draft linkage means and disposed in a general parallel relationship thereto.

2. A mower suspension system, as recited in claim 1, wherein said lift linkage structure includes a ball joint attaching assembly for interconnecting a rear mounting bracket fixed to said mower unit with said lift linkage structure.

3. A mower suspension system, as recited in claim 2, wherein said draft linkage structure comprises a slender U-shaped rod having a base portion connected to said support means and a pair of arms extending from opposite ends of said base portion to said mower unit for connection therewith.

4. A mower suspension, as recited in claim 3, wherein said support means comprises a generally inverted U-shape support attachment having a back portion fixed to the underside of said front axle, a pair of laterally spaced legs depending downwardly from said back portion, each of said legs including an opening for receiving said base portion of said draft linkage and a flange portion extending from said back portion and rotatively disposed about the longitudinal pivot axis of said front axle.

5. A mower suspension system for a mobile lawn vehicle comprising in combination:
    a frame structure having a power source disposed thereon;
    a pair of laterally spaced front wheels rotatively mounted on opposite ends of a transverse front axle which is pivotally connected to said frame structure about a generally centrally extending longitudinal axis;
    a pair of laterally spaced attaching brackets fixed to and extending from said axle;
    a pair of laterally spaced rear wheels rotatively mounted on opposite ends of a transverse rear axle, said rear axle being mounted to said frame structure and spaced rearwardly of said front axle;
    a mower unit tractively coupled beneath said frame structure intermediately between said front and rear wheels, said mower unit including a housing having cutting means therein drivingly interconnected to said power source, said housing further including a pair of laterally spaced front mounting brackets and a rear mounting bracket;
    ground engaging means associated with said mower housing for maintaining said cutting means a predetermined height above the ground;
    draft linkage means pivotally interconnecting a forward portion of said mower unit with said front axle for allowing said mower unit to tilt from side to side in response to the pivotable movement of said front axle, said draft linkage means including a pair of laterally spaced front connecting arms pivotally interconnecting said front axle attaching brackets and said front mower housing mounting brackets, each arm being pivotally connected about one end to a respective front axle attaching bracket and pivotally connected about the other end to a respective mower mounting bracket; and
    a rear lift linkage structure having one end pivotally connected to said frame structure about a transverse axis and the other end pivotally connected to said rear mower mounting bracket, said arms and rear lift linkage structure being of approximate equal length and disposed in general parallel relationship such that the longitudinal center line of the mower unit moves up and down generally parallel to said frame structure as said ground engaging means moves over undulations in the ground.

6. A mower suspension system for a mobile lawn vehicle comprising:

a mobile frame structure;

a front axle pivotally mounted about a longitudinally extending axis to said frame structure and revolvable thereabout;

a rear axle mounted to said frame structure rearwardly of said front axle;

wheels rotatively mounted on opposite ends of said front and rear axles;

an attachment support fixed to said front axle and depending therefrom, said attachment support having a pair of laterally spaced legs with attaching openings therein;

a mower unit disposed beneath said frame structure intermediately between said front and rear axles, said mower unit including a housing structure having cutting elements therein and a pair of laterally spaced front mounting brackets fixed thereto;

a rear mounting bracket fixed to a center rear portion of said mower housing and extending upwardly therefrom, the upper portion of said rear mounting bracket having a ball joint attaching assembly disposed therein;

draft linkage means pivotally interconnecting a forward portion of said mower unit with said front axle for allowing said mower unit to tilt from side to side in response to the pivotable movement of said front axle, said draft linkage means including a front draft linkage structure interconnecting said legs of said attaching support with the front mounting brackets of said mower housing, said draft linkage structure including a pair of corresponding arms each pivotally connected at one end to a respective leg and pivotally connected at the other end to a respective mower housing mounting bracket; and a rear lift linkage structure having one end pivotally connected to said frame about a transverse axis that extends generally parallel to the two pivot axes formed by the connection of said draft arms with said attaching support legs and mower housing mounting brackets, the other end of said lift linkage being pivotally mounted to said ball joint assembly, said lift linkage structure being of approximately equal length as said front draft linkage structure and disposed in parallel relationship thereto such that the linkage structures interconnecting said frame structure and mower unit defines a general parallel four bar linkage that permits the mower unit to move up and down in a plane generally parallel to said frame structure but further enables the mower unit to tilt to a degree from side to side in response to the pivotal movement of said front axle as said front wheels move over ground irregularities.

7. A mower suspension system, as recited in claim 6, wherein said front draft linkage structure is comprised of a generally U-shaped rod having a base portion extending between said arms, said base portion being adapted for insertion into the openings of attachment support legs.

8. A mower suspension system, as recited in claim 7, wherein each of said legs of said attachment support is provided with a latch pivotally mounted adjacent the opening in each leg and adapted to curl therearound and secure said base portion of said U-shaped rod in said openings, each of said legs further provided with a lock pivotally mounted adjacent said latch and having an end portion adapted to engage said latch for locking the same and securing the base portion in said openings.

9. A mower suspension, as recited in claim 6, wherein said front axle is pivotally mounted about a longitudinally extending shaft and wherein said attachment support which is fixed to said front axle further includes a flange portion rotatively mounted around said shaft, thus tending to stabilize the front axle.

10. A mower suspension system, as recited in claim 6, wherein said rear lift linkage structure includes a pair of links each pivotally connected to corresponding outside portions of said frame structure and depending generally downwardly and inwardly therefrom to where their lower portions are disposed in spaced apart relationship and have transverse aligned openings therein for receiving a connecting pin which when employed extends through said transverse aligned openings and the ball joint attaching assembly, thereby coupling the rear of said mower unit to said rear lift linkage structure.

11. In a mobile lawn vehicle having a main frame, a transverse front axle pivotally mounted for rocking movement about an axis disposed centrally of said main frame and extending longitudinally with respect thereto, mounting brackets fixed to said front axle and extending therefrom, a rear axle spaced rearwardly of said front axle and disposed transversely across the rear of said main frame, wheels rotatively mounted on opposite ends of said front and rear axles, a mower unit having cutting elements therein tractively coupled beneath the main frame of said lawn vehicle intermediately between said front and rear axles, the improvement comprising: a three point mower suspension system including draft linkage means pivotally interconnecting a forward portion of said mower unit with said front axle for allowing said mower unit to tilt from side to side in response to the pivotable movement of said front axle, said draft linkage means including a pair of generally coplanar laterally spaced arms pivotally connected at one end to said front axle mounting brackets and extending therefrom where the other ends are pivotally connected to front mounting brackets on said mower unit, and a rear linkage structure pivotally secured at one end to said main frame rearwardly of said front axle and extending therefrom where the other end is pivotally connected at a single point to said mower unit, the single point connection being spaced rearwardly of the connection of said arms with said mower unit, said rear linkage structure being approximately equal in length to each of said arms and disposed in general parallel relationship thereto, whereby said mower unit may tilt from side to side while the longitudinal center line thereof remains generally parallel to said main frame.

* * * * *